(12) United States Patent
Augustinus et al.

(10) Patent No.: US 12,427,611 B2
(45) Date of Patent: Sep. 30, 2025

(54) POSITIONING DEVICE FOR CARDS

(71) Applicant: IAI industrial systems B.V., Veldhoven (NL)

(72) Inventors: Arnoud Augustinus, Eersel (NL); Johannes Hendrikus Antonius Verheijen, Eindhoven (NL); Hendrik Jan Budel, Veldhoven (NL); Jordy Donze, 's-Hertogenbosch (NL); Marco Heesakkers, Eindhoven (NL)

(73) Assignee: IAI industrial systems B.V., Veldhoven (NL)

( * ) Notice: Subject to any disclaimer, the term of this patent is extended or adjusted under 35 U.S.C. 154(b) by 927 days.

(21) Appl. No.: 17/648,353

(22) Filed: Jan. 19, 2022

(65) Prior Publication Data

US 2022/0226947 A1    Jul. 21, 2022

(30) Foreign Application Priority Data

Jan. 20, 2021 (EP) .................................. 21152531

(51) Int. Cl.
  *B23Q 1/54* (2006.01)
  *B23Q 15/14* (2006.01)
  *B44B 3/06* (2006.01)

(52) U.S. Cl.
  CPC .......... *B23Q 1/5443* (2013.01); *B23Q 15/14* (2013.01); *B44B 3/065* (2013.01); *B23Q 2703/00* (2013.01)

(58) Field of Classification Search
  CPC .. B23Q 1/5443; B23Q 15/14; B23Q 2703/00; B44B 3/065; B23K 37/0452;
  (Continued)

(56) References Cited

U.S. PATENT DOCUMENTS 3,508,806 A * 4/1970 Hall ..................... G02B 21/26
                                              269/157
3,925,602 A * 12/1975 Doi ......................... G03F 1/68
                                              358/3.32
(Continued)

FOREIGN PATENT DOCUMENTS

EP         3424731 A1      1/2019
EP         4032716         7/2024
WO    WO-2020188611 A1     9/2020

OTHER PUBLICATIONS

"European Application Serial No. 21152531.6, Response Filed Jan. 16, 2023 to Extended European Search Report mailed Jun. 15, 2021", 10 pages.
(Continued)

*Primary Examiner* — Seahee Hong
(74) *Attorney, Agent, or Firm* — Schwegman Lundberg & Woessner, P.A.

(57) ABSTRACT

The present invention relates to a positioning device for rotatably and rectilinearly positioning a card with respect to a treatment unit having an axis of treatment. The positioning device comprises a card holder for holding a card in a fixed position, wherein the card holder defines a virtual card surface plane coincident with the surface of a card facing the treatment unit once the card is placed in the card holder, and wherein the card holder defines a virtual card center point coincident with the intersection point of the axis of treatment and the virtual card surface plane. The positioning device further comprises a manipulator to which the card holder is attached, wherein the manipulator comprises: a cardanic element with a first axis of rotation and a second axis of rotation; and a virtual pivot point being the intersection of the first and the second axis of rotation.

16 Claims, 5 Drawing Sheets

Figure 1:
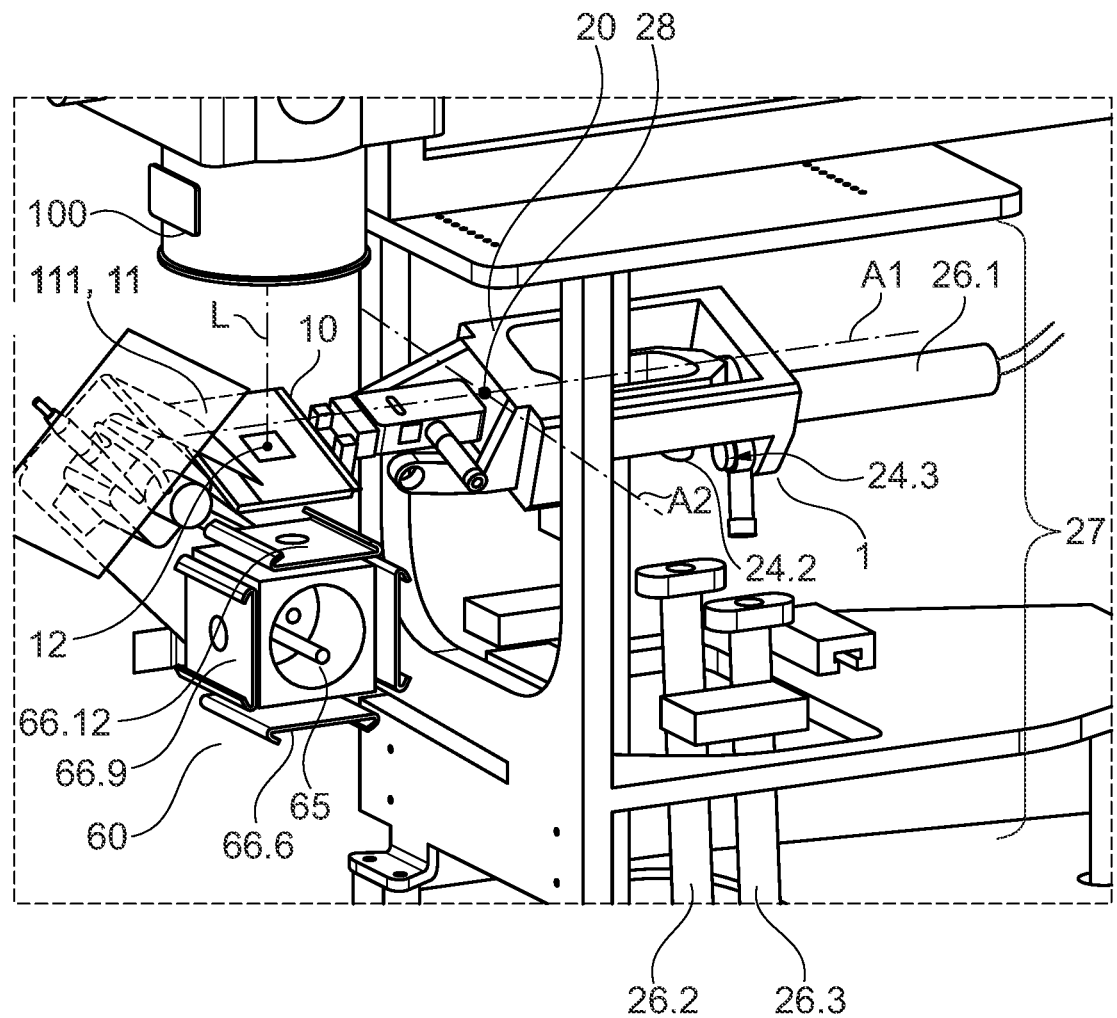

(58) Field of Classification Search
CPC .... B23K 37/0435; B23K 26/402; B23K 26/364; B23K 26/0861; B23K 26/0006; B23K 2103/40; B41J 3/283
See application file for complete search history.

(56) References Cited

U.S. PATENT DOCUMENTS

| | | | | |
|---|---|---|---|---|
| 4,545,106 | A * | 10/1985 | Juengel | G01B 7/003 414/730 |
| 5,865,576 | A * | 2/1999 | Arai | B23Q 1/5462 408/91 |
| 6,363,849 | B1 * | 4/2002 | Philipp | B41F 17/001 101/163 |
| 6,528,762 | B2 * | 3/2003 | Mayer | B23K 26/043 219/121.81 |
| 7,185,412 | B2 * | 3/2007 | Penick | B23Q 1/012 29/560 |
| 7,196,798 | B2 * | 3/2007 | Tsai | G01B 21/042 356/400 |
| 7,290,978 | B2 * | 11/2007 | Tran | G01N 21/9501 901/31 |
| 2004/0120782 | A1 * | 6/2004 | Gunstone | B23Q 1/52 409/221 |
| 2012/0183341 | A1 | 7/2012 | Takahashi et al. | |
| 2013/0220984 | A1 | 8/2013 | Cronin et al. | |
| 2016/0368110 | A1 | 12/2016 | Lu et al. | |
| 2019/0084112 | A1 * | 3/2019 | Kojima | B23Q 17/2275 |

OTHER PUBLICATIONS

"European Application Serial No. 21152531.6, Extended European Search Report mailed Jun. 15, 2021", 9 pgs.

* cited by examiner

POSITIONING DEVICE FOR CARDS

The present application claims the benefit of priority to European Appl. No. 21152531.6, titled "Positioning Device for Cards," filed Jan. 20, 2021, which is hereby incorporated by reference herein in its entirety.

The present invention relates to a positioning device for positioning a flat piece with respect to a treatment device, for instance for presenting a card or passport to a laser for engravement. In particular, the invention relates to a positioning device for positioning a card with respect to a treatment device under multiple angles and positions. Further, it relates to a method for operating the positioning device.

Flat pieces such as plastic cards are used in different technical areas and need to be treated in different ways. Cards can be used as passport card or identity card. For example, a card printer can be used to print an image and/or graphical elements on the flat piece, a laser may be used for engraving, the flat piece may be laminated, cured, cut, embossed or otherwise treated.

One requirement for performing such treatments and manipulations is an efficient and highly automated manner for handling the cards and for presenting the cards to the treatment devices. In some applications, there is a need of tilting and lifting the card and present it to the treatment device under different angles and positions. When rotating the card with respect to for instance a laser, the axis of the working beam will undergo an offset on the card.

It is an object of the invention to avoid the disadvantages of the prior art.

This object is solved by a positioning device according to claim 1 and a method of operating such a positioning device according to the independent method claim. Further advantages are defined in the dependent claims.

The object of the invention is achieved by a positioning device for rotatably and rectilinearly positioning a flat piece, especially a card, with respect to a treatment unit, preferred a laser, with an axis of treatment comprising a card holder for holding a card in a fixed position, wherein the card holder defines a virtual card surface plane coincident with the surface of a card facing the treatment unit once the card is placed in the card holder and wherein the card holder defines a virtual card center point coincident with the intersection point of the axis of treatment and the virtual card surface plane, a manipulator to which the card holder is attached, wherein the manipulator comprises a cardanic structure or cardanic element with a first axis of rotation and a second axis of rotation and a virtual pivot point being the intersection of the first and the second axis of rotation In a further embodiment there are three linear guides, wherein each linear guide is flexibly attached to the cardanic element at a contact point.

In a further embodiment, the virtual pivot point of the cardanic element, the first axis of rotation and the second axis of rotation lie in the virtual card surface plane.

The positioning device for rotatably positioning a flat piece, especially a card like an identity card or a passport is a tool for presenting a card to a treatment unit. It comprises a card holder in which a card is received and fixed. Thus, the card holder can be handled in which the card is fixed. The card holder can be automatically picked up and moved around and the card contained in the card holder can be subjected to treatment. Especially, the card can be presented under different angles and positions to the treatment unit, preferred a laser. Thus, the card can be tilted with respect to the working axis of the beam of a laser and can be positioned closer or further away from the laser. Thus, the laser can engrave different areas under different angles and with different distances on the card.

The card holder is a mechanical tool for holding a card in a fixed position. Preferably the card holder can clamp the card, comprise elements to hold the card, make use of shifting frame parts to grip the card, etc. Preferably, the card holder is adjustable to fit for different sizes of cards. Preferably, the mechanism to adapt for different sizes of cards is used to hold the card at the same time.

The card holder has an opening to receive the card and thus defines a virtual card surface plane coincident with the surface of a card facing the treatment unit once the card is placed in the card holder. This virtual card surface plane is the area in the card holder where the card can be inserted and especially this virtual card surface plane is the plane of the surface of the card once inserted. This plane is confined by the type of cards, especially the thickness of cards to be inserted and by the frame elements of the card holder and is a virtual plane in the card holder. If no card is contained in the card holder, this virtual card surface plane is still defined with respect to the geometry of the card holder and the type of card to be inserted.

Further, the geometry of the card holder defines a virtual card center point. This virtual card center point is coincident with the intersection point of the axis of treatment and the virtual card surface plane. The axis of treatment is the axis of the working beam of the treatment unit, especially the working axis of the laser beam of the laser used for engraving. The card holder when attached to the manipulator defines one point of intersection between the working beam of the laser and the virtual card surface plane. Preferably, this point of intersection is the center of the working area on the card. Especially preferred this point of intersection is even the center of the card. It is possible that the working area is only a part of the card, for instance the left upper corner of the card. In such circumstances the intersection point of the axis of treatment and the virtual card surface plane is in the center of this area. If the center of the card or the whole card is going to be processed, it is advantageous to have the intersection point of the axis of treatment and the virtual card surface plane in the geometrical center of the card once inserted and it is preferably the point on the surface of the card facing the treatment unit when the card is presented perpendicular to the working axis of the treatment unit.

The positioning device further comprises a manipulator for translating and/or rotating the card holder and thus the card with respect to the treatment unit. By the use of the manipulator it is possible to tilt and rotate the card with respect to the treatment unit, especially with respect to the axis of the working axis of the treatment unit, for instance the axis of the working beam of the laser.

The card holder is attached to the manipulator. Thus, the card holder is moved according to the movement of the manipulator. Preferably, the card holder is attached to a gripper of the manipulator.

The manipulator comprises a cardanic structure or cardanic element with a first axis of rotation and a second axis of rotation and a virtual pivot point being the intersection of the first and the second axis of rotation. Such a cardanic structure preferably comprises rotational bearings and/or linear guidings and mechanical structures to ensure the movement along the first and second axis of rotation and thus around a virtual pivot point. With the structure of the guiding parts, a virtual cardanic point is achieved. With the cardanic element, a movement of the cardanic element—and insofar also of the connected parts, i.e. the card holder—around the virtual pivot point of the cardanic element is achieved. Thus, it is possible to move the cardanic system around this virtual pivot point thereby tilting the card holder and the position of the card with respect to the axis of treatment, especially the working beam of the laser. This is preferably done for two rotational degrees of freedom, meaning that the third rotational degree of freedom is prevented, at least coupled to another element e.g. the base of the manipulator.

The cardanic structure or element is preferably connected to three linear guides. A linear guide is a guide which performs a translational movement in one direction, for instance parallel to the direction of the working axis of the treatment unit or perpendicular to it.

Each linear guide is flexibly attached to the cardanic element at a contact point. These contact points are not in a straight line in space. Preferably, the first linear guide is directly connected with the cardanic element. For stability reasons it is also possible that the linear guide has an external linear guiding parallel with the first linear guide. The two other linear guides each are connected via a connecting rod with spherical bearing elements (ball joints) on both ends that connect all three translational degrees of freedom at each rod end, but allow all three rotational degrees of freedom at each rod end. By flexibly attaching the linear guide to the cardanic structure or element, it is possible—when performing a translational movement of the linear guide in z-direction—to allow for a movement of the cardanic element and the card holder around the first axis of rotation and/or the second axis of rotation of the cardanic element. The manipulator is preferably built with three parallel linear guides. Using these pillars makes it possible to move in focus direction (along the working axis of the laser) only or move around one of the angles around x (transport direction) or around y (in plane of card, perpendicular to x) or a combination of angles around xy or a combination of angles and focus.

The cardanic element is preferably constructed such that the virtual pivot point of the cardanic element, the first axis of rotation and the second axis of rotation lie in the virtual card surface plane. Thus, the intersection of the first and the second axis of rotation of the cardanic system are on the surface of a card once inserted facing the treatment unit, preferably the laser. With the alignment of the first and second axis of rotation to the (virtual) card surface and the positioning of the card in horizontal (X-Y) direction so that the mid-point of the working area on the card coincides with the optical axis of the laser, the virtual pivot point is placed in the middle of the working area of the card surface. Thus, the centerline of the two axis of rotation have a zero distance to the card surface and the distance between the midpoint of the working area of the card and the laser axis is zero.

In a further embodiment, a positioning device is provided, wherein the virtual pivot point is coincident with the virtual card center point. Thus, the virtual cardanic point or virtual pivot point is the virtual card center point, i.e. the center of the card.

Further, a positioning device is provided, wherein each linear guide is flexibly attached to the manipulator or preferably the cardanic structure via a spherical bearing element, especially a ball joint. Preferably, the first linear guide is connected with the cardanic element through (another) cardanic coupling which allows two rotational degrees of freedom, but does not allow the third rotational degree of freedom neither the three translational degrees of freedom. For stability reasons it is also preferred that the first linear guide has an external linear guiding parallel to that linear guide. The two other linear guides each are connected via a connecting rod with spherical bearing elements (ball joints) on both ends that connect all three translational degrees of freedom at each rod end, but allow all three rotational degrees of freedom at each rod end. This way of attachment allows for a movement of the linear guides in z-direction and for changing the angle between the linear guides and the cardanic element of the manipulator.

The linear guides can be arranged in any angle to each other. Preferably, the linear guides are arranged parallel to each other. With this arrangement it is very simple to realize a movement of the card towards to and away from the treatment device without any compensation for tilting and rotating. Thus, when using a laser the card can easily be positioned in different focus distances. Preferably, the linear guides are driven by controlled actuators like stepper motors, servo motors, linear motors, servo-pneumatics or piezo-motors.

Further, a positioning device is provided, further comprising an x-y shifting unit. With the x-y-shifting unit it is possible to move the card holder in the x-y plane, i.e. the plane perpendicular to the working axis of the treatment device. With a x-y shifting unit it is possible to shift the virtual pivot point of the cardanic system in x-y plane. Thus, the virtual pivot point can be placed at any point within the reach of the x-y shifting unit. For example, when treating a card with a laser under different angles it can be experienced that the working area on the card becomes smaller due to an unwanted goniometrically induced horizontal shift Lx(1−cos(alpha)). With the use of a x-y-shifting unit it is possible to cover the entire card or data page by shifting the set-up with the 3 actuators when placed on a x-y shifting unit or x-y-stage. Preferably, this is set up to run automatically, so it is possible to change over to another layout with no delay (from card to card) which brings more flexibility for the end user. Further, with a compensation in the x-y-plane it is possible to eliminate unwanted shift effects when tilting the card holder with respect to the working beam.

The x-y-shifting unit is preferably attached to the manipulator and is arranged to move the manipulator. Further, x-y-shifting unit can preferably move the complete setup with document and positioning unit to ensure all layouts can be handled more easily, for instance further different positions of the feature to be engraved on the card. Thus, with the x-y-shifting unit it is possible to change the virtual card center point for a new area to be processed on the same card.

Further, a positioning device is provided, further comprising a controller unit for controlling the movement of the linear guides and/or the x-y shifting unit. With a controller unit it is possible to program different optimized movements of the card holder by controlling the linear guides and/or the x-y shifting unit. Thus, it is possible to handle the cards and the tilting of the cards under different angles automatically and speed up the treatment time and throughput of cards.

The object of the invention is also achieved by an engraving unit comprising a positioning device according to the invention, a treatment unit, preferably a laser, a card handler and an interface to a transport unit for transporting cards. The interface can comprise an exchanger exchanging the engraved card with a blank card.

An engraving unit is a unit which handles the cards and engraves them. The card is fed to the engraving unit by a transport system and taken in by the interface to the transport system. This interface presents the card to the card handler. The card handler ensures the right position of the card to be processed and passes it on to the positioning device in a precise manner. The positioning device positions the card and the card holder with respect to the laser beam during treatment. Afterwards, the card is transferred back through the card handler and the interface to the transport unit.

The engravement unit is very sensitive to vibrations. However, the transport system usually is a source of vibrations in a scale to influence the quality of the engraving and this can lead to distortions in the engraved features. Thus, it is preferred to support the engraving unit, i.e. the engrave laser together with the card holder on an isolated base. This base is preferably supported by rubber vibration isolators or dampers. These isolators or dampers preferably have a high compliancy, i.e. preferably they have a low rigidity. Due to this compliancy, the exact position of the isolated base is unknown, even more its position can vary. Thus, the isolated base moves a bit during operation, i.e. it floats with an amplitude in all directions between ±1 and ±2 mm.

When looking at the card transportation, there are two steps of transferring a card from the non-isolated world to the isolated base (which floats). The first step is the transfer of a card between the non-isolated world and the isolated base and the second step to connect back with the main transport system. Preferably, there are two solutions to combine the bridging with the exchange function:

1. to connect the exchanger to the isolated base.
2. to connect the exchanger to the non-isolated world.

Thus, in one embodiment the treatment unit is isolated with respect to the transport unit as far as vibrations are concerned and the positioning device is also isolated with respect to the transport unit as far as vibrations are concerned. With this embodiment, the card handler and thus the exchanger is not isolated and the bridging will focus on the transfer of the card from the card handler to the positioning device and back. This is solution 2 as described above.

In the other embodiment, the card handler, i.e. the exchanger is also isolated with respect to the transport unit as far as vibrations are concerned. This is solution 1 as described above. With this embodiment, the bridge will focus on the transfer of the card from the transportation unit to the card handler.

For both solutions it is preferred to provide the rotator with a mechanical or magnetic lock at 12-o'clock positions to release the card holder, so it can be pulled off in those positions. Further, the rotator has preferably lead-in faces that align the card holder to the rotator when the card holder is put back to the rotator by the aligner or the gripper of the manipulator.

With solution 1 it is preferred to also have a mechanical or magnetic lock at the 6-o'clock position and/or provide an aligner at the 6-o'clock position of the rotator of the card handler that pulls off the card holder from the rotator. Further, it is preferred to provide lead in faces that pick up and align the card holder to the main transport when the card holder is pulled off (downwards). Preferably, the down position of the cardholder (at 6-o'clock) is equal to the main transport level, enabling transfer from main transport to card holder and back on.

With solution 2 it is preferred to provide lead-in faces on the gripper of the manipulator that align the card holder with the gripper.

In one embodiment, the card holder (with the card contained in the card holder) is transferable from the card handler to the positioning device and vice versa. The interface to the transport unit transfers a card from the transport unit to the card holder. The card holder is preferably attached to the rotator of the card handler. Preferably, there is provided a mechanical or magnetic lock for releasing the card holder on the 12 o'clock position for transfer to the positioning device.

In one embodiment there is provided an engraving unit, wherein the card handler comprises a rotator with at least three positions, preferably with at least four positions (3-o'clock, 6-o'clock, 9-o'clock and 12-o'clock) to receive one card holder each. Preferably, the positions of the rotator have a lead-in face that align the card holder to the rotator when the cardholder is put back to the rotator.

In one embodiment there is provided an engraving unit, wherein the card handler comprises a camera which is adapted to take an image of a card holder once received in one of the positions of the rotator. Preferably, this information of the image is used to correct any off-set of the real position of the card to an ideal position of the card when engraving with the laser. Preferably, the image is taken before the position in which the card is engraved, for instance at the 9-o'clock position instead of taking the picture in the cardholder under the laser (at 12-o'clock). As a result, speed is increased since taking an image at 9-o'clock can be done in parallel with the transfer and engraving at 12-o'clock. Thus, the laser has not to wait for the image to be taken.

The object of the invention is also achieved by a method of operating a positioning device according to the invention, wherein the manipulator is moved according to the cardanic element and wherein the virtual pivot point of the cardanic element, the first axis of rotation and the second axis of rotation are placed on a predefined point in the space around the positioning device, preferably in the virtual card surface plane.

Further preferred is a method of operating a positioning device according to the invention, wherein the intersection of the first and the second axis of rotation is coincident with the virtual card center point.

Further, methods are preferred to transfer the cards from the transport unit to the card handler and to the positioning device and engraving the card and transferring back the card through all steps to the transport unit. Further details of the method are disclosed in the description in context of the products in this application above and in the detailed description of the figures.

Figure 2A:
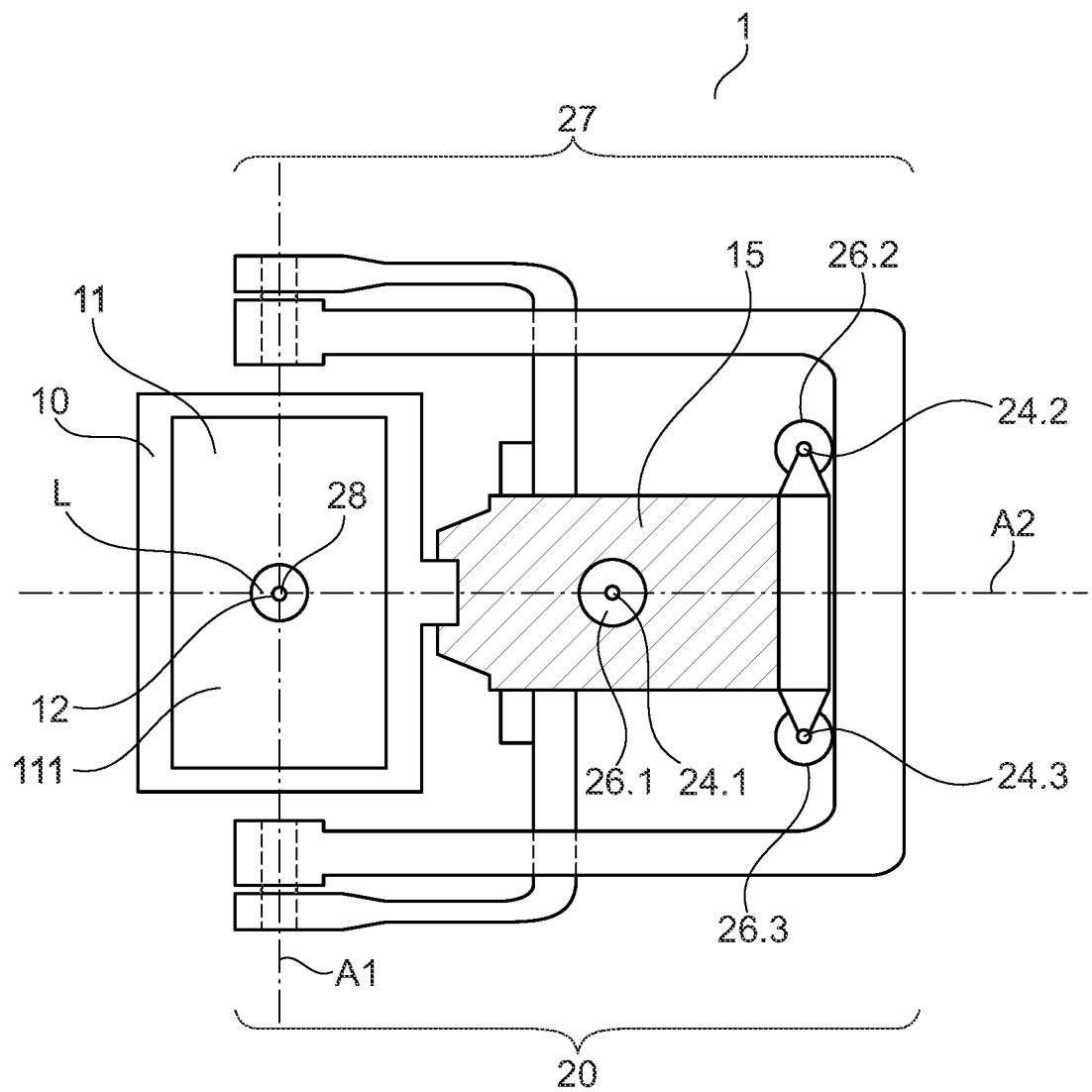
Figure 2B:
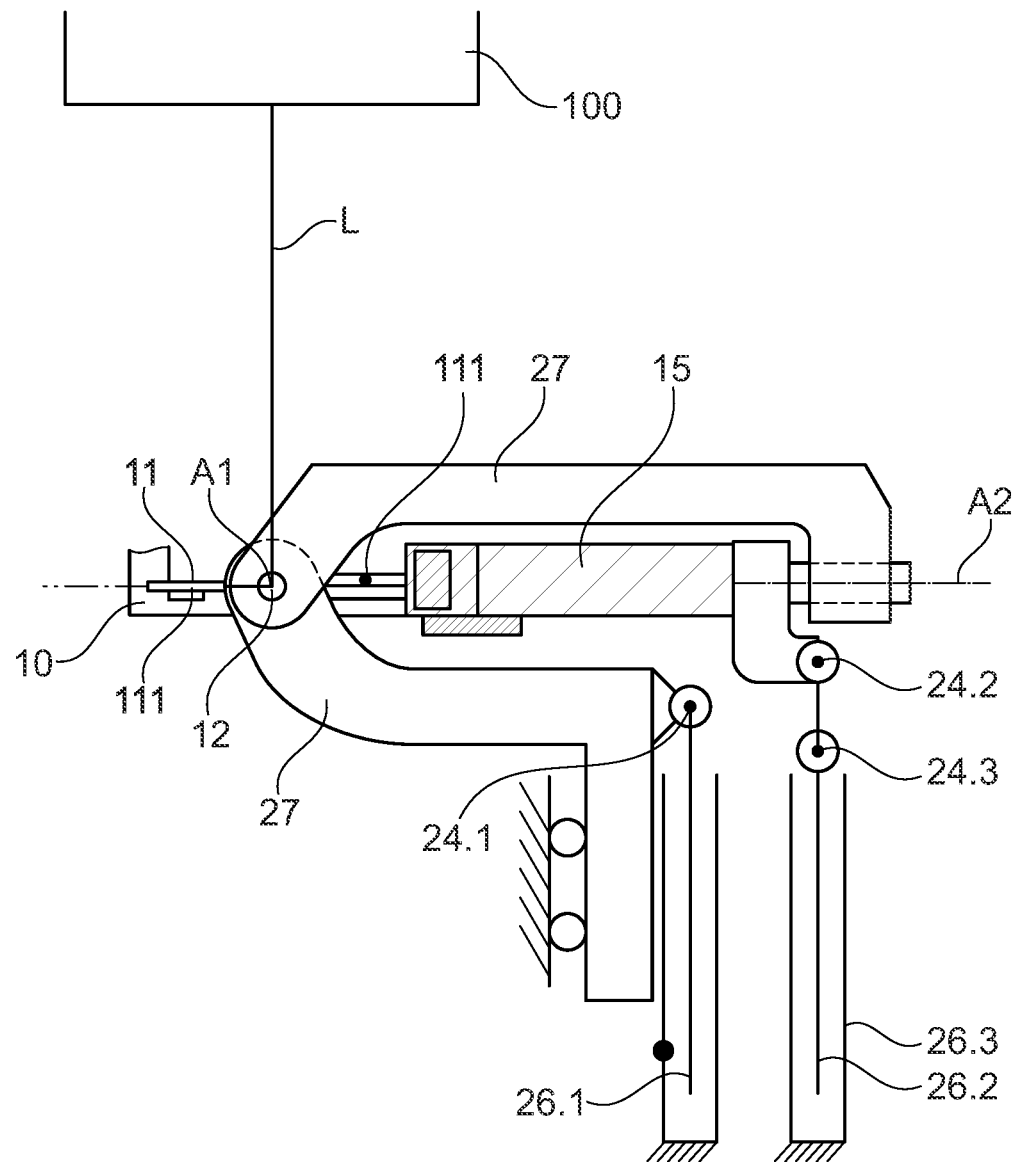
Figure 3:
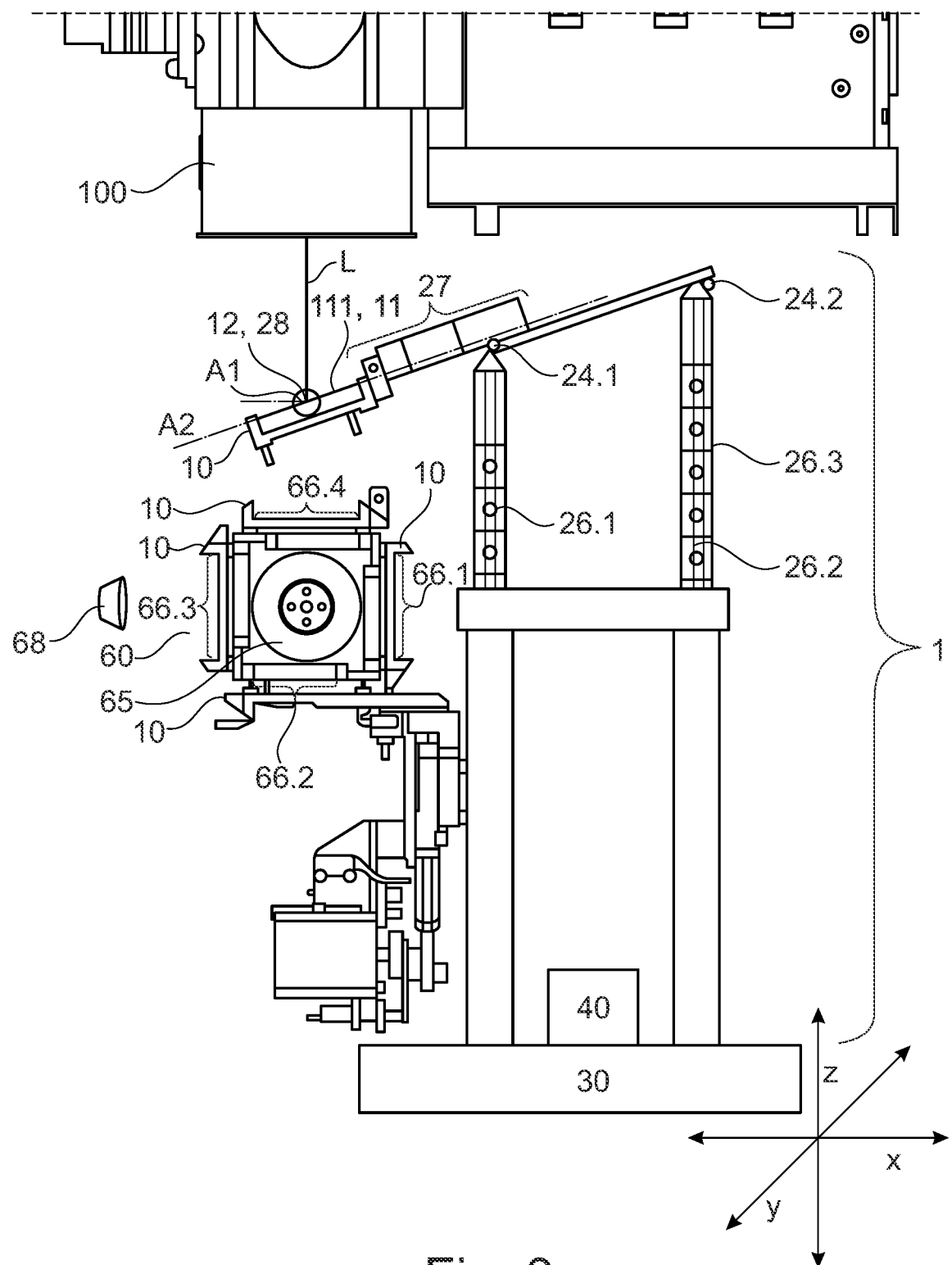
Figure 4:
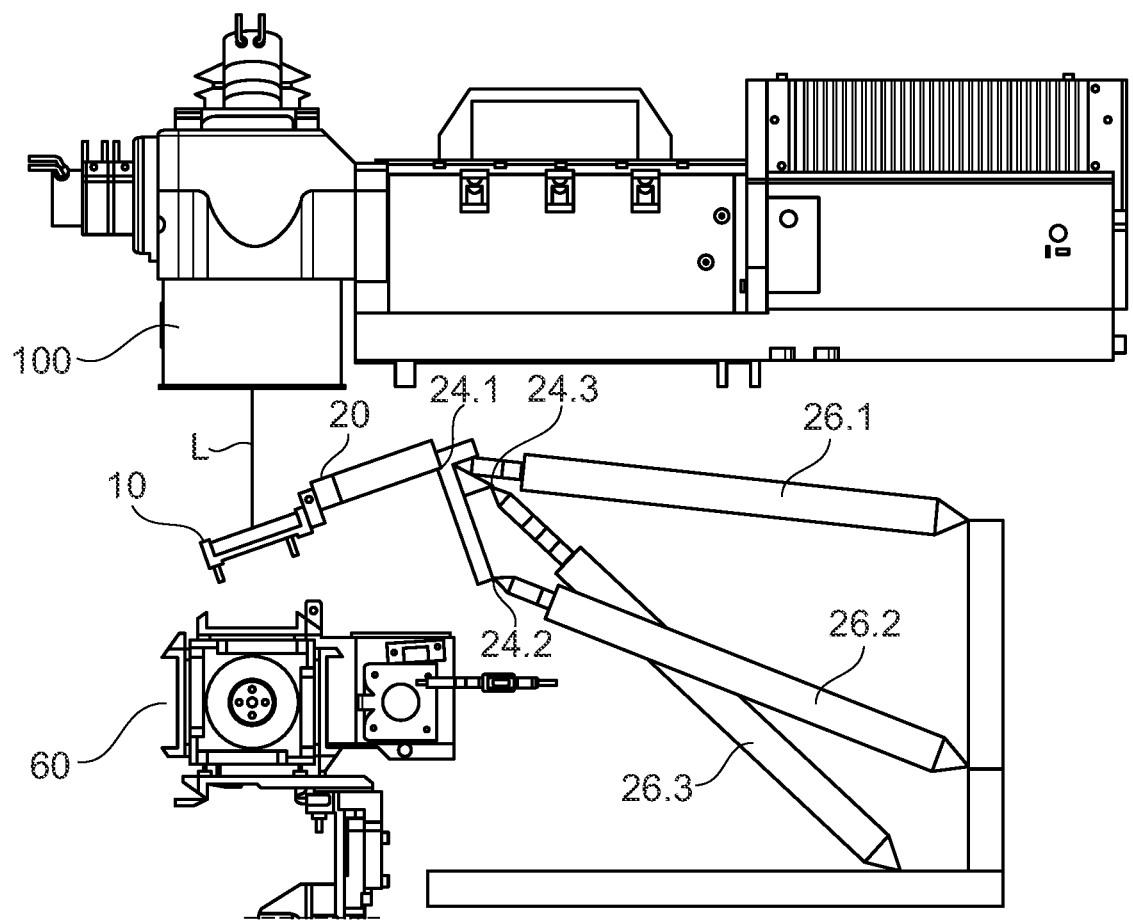

The invention is described with respect to the figures. The figures show:

FIG. 1 a schematic view of an embodiment of a positioning device according to the present invention with two parallel linear guides and one perpendicular linear guide, FIG. 2a a schematic top view of an embodiment of a positioning device according to the invention, FIG. 2b a schematic side view of an embodiment according to FIG. 2a, FIG. 3 a schematic side view of an embodiment of a positioning device with parallel linear guides, a treatment unit and a card handler according to the present invention, FIG. 4 a schematic side view of an embodiment of a positioning device with non parallel linear guides, a treatment unit and a card handler according to the present invention.

FIG. 1 shows a schematic view of an embodiment of a positioning device according to the present invention with two parallel linear guides 26.2, 26.3 and one perpendicular linear guide 26.1. A laser 100 with an axis L of the laser beam are directed on the center of a card holder 10 of a manipulator 20. In the card holder 10 is a card 111 with a surface plane 11. In the center of the card 111 is a virtual card center point 12. Linear guides 26.2 and 26.3 are arranged parallel to each other in z-direction and connected to the manipulator 20 at contact points 24.2 and 24.3, respectively. A third linear guide 26.1 is arrange perpendicular to the other linear guides 26.2 and 26.3. The cardanic system 27 has two axis of movement A1 and A2. The intersection of these axis A1 and A2 is the virtual pivot point 28 of the cardanic element or system 27. By means of the manipulator, the card holder 10 and thus the card 111 can be moved around, especially in the beam of the laser 100. These movements are rotational movements as well as linear movements, for instance towards the laser and away from the laser 100. Further, a card handler 60 is shown with a rotator 65 and four different positions 66.3 (not shown), 66.6, 66.9 and 66.12 to hold a card holder 10.

FIG. 2a shows a schematic drawing of an embodiment of a positioning device according to the invention. A positioning device 1 for rotatably positioning a card 111 with respect to a treatment unit (above the drawing plane) with an axis of treatment L is shown. A card holder 10 is holding a card 111 in a fixed position. Within the card holder 10 a virtual card surface plane 11 is shown which is coincident with the surface of the card 111 facing the treatment unit 100, i.e. above the plane of drawing.

A virtual card center point 12 is coincident with the intersection point of the axis of treatment L and the virtual card surface plane 11. The card holder 10 is attached to the manipulator 20 by the use of a gripper 15. The manipulator 20 comprises a cardanic element 27 with a first axis of rotation A1 and a second axis of rotation A2 and a virtual pivot point 28 being the intersection of the first and the second axis of rotation A1 and A2. Further, three linear guides 26.1, 26.2, 26.3 can be seen in top view. Each linear guide 26.1, 26.2, 26.3 is flexibly attached to the cardanic element 27 at a contact point 24.1, 24.2, 24.3.

FIG. 2b shows a schematic side view of an embodiment according to FIG. 2a. In this view, the linear guides 26.1, 26.2 and 26.3 can be seen from the side and also the laser 100 and the axis of the laser beam L can be seen. The axis L coincides with the intersection of the axis of rotation A1 and A2 of the cardanic system 27. The virtual card surface plane 11 coincides with the surface of the card 111 facing the laser 100, i.e. the upper side of the card 111. The virtual card center point 12 coincides with the intersection of the axis L and the surface of the card.

When moving the linear guides 26.1, 26.2, 26.3 the cardanic system 27 moves around the two axis of rotation A1 and A2 and thus creates a virtual pivot point 28 of the cardanic system 27 on the surface of the card 111 at the intersection of the laser beam L and the surface of the card.

FIG. 3 shows a schematic side view of an embodiment of a positioning device 1, a laser as a treatment unit 100 and a card handler 60 according to the present invention. In the positioning device 1 the three linear guides 26.1, 26.2, 26.3 can be seen, whereas the columns 26.2 and 26.3 are pictured in flight. The cardanic element 27 is shown schematically without the guidings and the mechanical structure. The card holder 10 holds a card 111 whereas the surface of the card 111 coincides with the virtual card surface plane 11. The first and second axis of rotation A1 and A2 of the cardanic system 27 are shown. A2 is shown in dotted line whereas A1 is perpendicular to the drawing plane.

The working beam along the axis L of the laser 100 is hitting the surface of the card 111 at the virtual card center point 12 which is also the virtual pivot point 28 of the cardanic system 27. The card holder 10 is shown in a tilted angle around the axis A1 but not tilted around the axis A2.

The laser beam along axis L engraves an image on the card 111. Further, a x-y shifting unit 30 is shown schematically with which the manipulator can be moved in x-y direction thus shifting the virtual pivot point of the system in the x-y plane.

In FIG. 3, also a card handler 60 is shown with a rotator 65 and four positions of the rotator 66.1, 66.2, 663. and 66.4. In these positions, card holders 10 are attached. A camera 68 is shown which is directed onto position 66.3, i.e. the 9-o'clock position of the rotator turning clockwise.

The camera takes an image of position 66.3 showing the card in the card holder in position 66.3 and any off-sets of the card from an ideal position of the card in the card holder. This information is used in the next step. When the rotator 65 rotates 90° clockwise, the card holder on position 66.3 moves to position 66.4. The positioning device 10 takes the card holder and positions it in the laser beam L. A control unit 40 determines the off-set from the image taken on the 9-o'clock position and compensates this off-set when controlling the cardanic element 27 by controlling the linear guides 26.1, 26.2, 26.3 thus moving the card holder in such a way that the laser engraves an image as planned and compensates for the off-set of the card in the card holder. The off-set can also be compensated by adjusting the laser beam when engraving or preferably a combination of both.

FIG. 4 shows a schematic side view of an embodiment of a positioning unit 20 with non parallel linear guides 26.1, 26.2 and 26.3, a treatment unit 100 and a card handler 60 according to the present invention. The linear guides are not parallel and can manipulate the manipulator when attacking on the contact points. The cardanic system is only shown schematically and not shown in detail. The card holder 10 can be moved within the working area of the laser 100 and the axis of the beam L. The card handler 60 is shown and has the functions as described above.

REFERENCE SIGNS

A1 first axis of rotation (of the cardanic element
A2 second axis of rotation (of the cardanic element
L axis of treatment (of the treatment unit)
1 Positioning device
10 card holder
11 virtual card surface plane
12 virtual card center point
15 gripper
20 manipulator
24 contact point of the linear guide on the manipulator
26 linear guide
27 cardanic element
28 virtual pivot point of the cardanic element
30 x-y shifting unit
40 controller unit
60 card handler
65 rotator
66 position on the rotator for a card holder
68 camera
100 treatment unit, especially a laser
111 flat piece, especially a card

The invention claimed is:

1. A positioning device for rotatably and rectilinearly positioning a card, with respect to a treatment unit having an axis of treatment, the positioning device comprising:

a card holder for holding the card in a fixed position, wherein the card holder defines a virtual card surface plane coincident with a surface of the card facing the treatment unit once the card is placed in the card holder, and wherein the card holder defines a virtual card center point coincident with an intersection point of the axis of treatment and the virtual card surface plane;
a manipulator to which the card holder is attached, wherein the manipulator comprises:
a cardanic element with a first axis of rotation and a second axis of rotation; and
a virtual pivot point being an intersection of the first axis of rotation and the second axis of rotation; and
three linear guides, wherein each linear guide is flexibly attached to the cardanic element at a respective contact point.

2. The positioning device of claim 1, wherein the virtual pivot point of the cardanic element, the first axis of rotation, and the second axis of rotation lie in the virtual card surface plane.

3. The positioning device of claim 1, wherein the virtual pivot point is coincident with the virtual card center point.

4. The positioning device of claim 1, wherein the card holder is removably attached to the manipulator by a gripper.

5. The positioning device of claim 1, wherein each linear guide is flexibly attached to the manipulator via a spherical bearing element.

6. The positioning device of claim 1, wherein the linear guides are arranged parallel to each other.

7. The positioning device of claim 1, wherein the linear guides are driven by controlled actuators.

8. The positioning device of claim 1, further comprising an x-y shifting unit.

9. The positioning device of claim 8, wherein the x-y shifting unit is attached to the manipulator.

10. The positioning device of claim 9, further comprising a controller unit for controlling the movement of at least one of the x-y shifting unit or the linear guides.

11. An engraving unit comprising:
a treatment unit having an axis of treatment;
a card handler; and
a positioning device comprising:
a card holder for holding a first card in a fixed position, wherein the card holder defines a virtual card surface plane coincident with a surface of the card facing the treatment unit once the card is placed in the card holder, and wherein the card holder defines a virtual card center point coincident with an intersection point of the axis of treatment and the virtual card surface plane; and
a manipulator to which the card holder is attached, wherein the manipulator comprises:
a cardanic element with a first axis of rotation and a second axis of rotation; and
a virtual pivot point being an intersection of the first axis of rotation and the second axis of rotation;
wherein the card holder is transferable from the positioning device to the card handler and from the card handler to the positioning device.

12. The engraving unit of claim 11, wherein the card handler comprises a rotator with at least three positions, each configured to receive one card holder.

13. The engraving unit of claim 12, wherein the at least three positions of the rotator have a lead-in face.

14. The engraving unit of claim 12, wherein the card handler comprises a camera that is adapted to take an image of the card holder once after being received in one of the at least three positions of the rotator.

15. A method of operating a positioning device, the positioning device comprising:
a card holder for holding a first card in a fixed position, wherein the card holder defines a virtual card surface plane coincident with a surface of the card facing a treatment unit once the card is placed in the card holder, and wherein the card holder defines a virtual card center point coincident with an intersection point of an axis of treatment of the treatment unit and the virtual card surface plane;
a manipulator to which the card holder is attached, wherein the manipulator comprises:
a cardanic element with a first axis of rotation and a second axis of rotation; and
a virtual pivot point being an intersection of the first axis of rotation and the second axis of rotation; and
three linear guides, wherein each linear guide is flexibly attached to the cardanic element at a respective contact point;
the method comprising moving the manipulator according to the cardanic element, wherein the virtual pivot point of the cardanic element, the first axis of rotation, and the second axis of rotation are placed on a predefined point in a space around or within the positioning device.

16. The method of claim 15, wherein the intersection of the first axis of rotation and the second axis of rotation is coincident with the virtual card center point.

* * * * *